US006859550B2

(12) United States Patent
Oh et al.

(10) Patent No.: US 6,859,550 B2
(45) Date of Patent: Feb. 22, 2005

(54) ROBUST METHOD FOR IMAGE FEATURE ESTIMATION

(76) Inventors: Seho Oh, 5229 107th St., Mukilteo, WA (US) 98275; Shih-Jong J. Lee, 15418 SE. 53rd Pl., Bellevue, WA (US) 98006

( * ) Notice: Subject to any disclaimer, the term of this patent is extended or adjusted under 35 U.S.C. 154(b) by 736 days.

(21) Appl. No.: 09/871,991

(22) Filed: May 31, 2001

(65) Prior Publication Data

US 2003/0016868 A1 Jan. 23, 2003

(51) Int. Cl.$^7$ ............................ G06K 9/46; G06K 9/62
(52) U.S. Cl. ....................... 382/155; 382/190; 382/283
(58) Field of Search ................................ 382/190, 282, 382/283, 155

(56) References Cited

U.S. PATENT DOCUMENTS 6,151,403 A * 11/2000 Luo ........................... 382/117
2002/0106112 A1 * 8/2002 Chen et al. ................. 382/117

OTHER PUBLICATIONS

Jolly et al. "Vehicle Segmentation and Classification Using Deformable Templates." IEEE Trans. on Pattern Analysis and Machine Intelligence, vol. 18, No. 3, Mar. 1996, pp. 293–308.*

Mirhosseini et al. "A Hierarchical and Adaptive Deformable Model for Mouth Boundary Detection." Proc. Int. Conf. on Image Processing, vol. 2, Oct. 26, 1997, pp. 756–759.*

Park et al. "Initialization of Deformable Templates Using Weighted Gaussian Approximations." Proc. IEEE Int. Conf. on Acoustics, Speech, and Signal Processing, vol. 4, Jun. 5, 2000, pp. 2231–2234.*

* cited by examiner

*Primary Examiner*—Jon Chang

(57) ABSTRACT

Noise or outliers corrupt image non-contact measurement of a geometric structure or geometric entity. A weight image is created prior to fitting whose pixel value indicates certainty of image information or feature signal strength. Learning images can enhance the weight image or it can be adjusted by iteration to achieve robust fitting results.

6 Claims, 16 Drawing Sheets

ROBUST METHOD FOR IMAGE FEATURE ESTIMATION

CO-PENDING U.S. PATENT APPLICATIONS

1. U.S. patent application Ser. No. 09/693,723, "Image Processing System with Enhanced Processing and Memory Management", by Shih-Jong J. Lee et. al., filed Oct. 20, 2000 now U.S. Pat. No. 6,400,849,
2. U.S. patent application Ser. No. 09/693,378, "Image Processing Apparatus Using a Cascade of Poly-Point Operations", by Shih-Jong J. Lee, filed Oct. 20, 2000 now U.S. Pat. No. 6,504,959
3. U.S. patent application Ser. No. 09/692,948, "High Speed Image Processing Apparatus Using a Cascade of Elongated Filters Programmed in a Computer", by Shih-Jong J. Lee et. al., filed Oct. 20, 2000 now U.S. Pat. No. 6,404,959,
4. U.S. patent application Ser. No. 09/703,018, "Automatic Referencing for Computer Vision Applications", by Shih-Jong J. Lee et. al., filed Oct. 31, 2000 now U.S. Pat. No. 6,678,404,
5. U.S. patent application Ser. No. 09/702,629, "Run-Length Based Image Processing Programmed in a Computer", by Shih-Jong J. Lee, filed Oct. 31, 2000
6. U.S. patent application Ser. No. 09/738,846 entitled, "Structure-guided Image Processing and Image Feature Enhancement" by Shih-Jong J. Lee, filed Dec. 15, 2000 now U.S. Pat. No. 6,463,175.
7. U.S. patent application Ser. No. 09/739,084 entitled, "Structure Guided Image Measurement Method", by Shih-Jong J. Lee et. al., filed Dec. 14, 2000 now U.S. Pat. No. 6,456,741.
8. U.S. patent application Ser. No. 09/815,816 entitled, "Automatic Detection of Alignment or Registration Marks", by Shih-Jong J. Lee et. al., filed Mar. 23, 2001
9. U.S. patent application Ser. No. 09/834/817 entitled, "Automatic Template Generation and Searching Method", Seho Oh et. al., filed Apr. 12, 2001 now U.S. Pat. No. 6,603,882.

REFERENCES

1. Stuart Geman et. al., "Stochastic Relaxation, Gibbs Distributions, and the Bayesian Restoration of Images", Transactions on Pattern Analysis and Machine Intelligence, Vol. PAMI-6, No. 6, November 1984, pp. 721–741.

BACKGROUND OF THE INVENTION

1. Technical Field

This invention relates to image estimation methods to improve representation of geometric entities within images when noise and outliers contaminate images.

Structure fitting is an important procedure for the measurement of geometrical entities within a digital image because it allows for a non-discrete representation of the image geometrical entity. Using the structure fit representation of the geometrical entity enables accurate measurement. Measurement accuracy achieved with this method usually is better than the pixel pitch contained in the original image. Such accuracy depends on accurate structure fitting to the features in an image. The traditional method of structure fitting is to extract a feature mask image from the original image and then apply the structure fitting technique using the mask portion of the image. This method is sensitive to the noise or distortion in the original image because they corrupt the mask. To overcome this problem, a weight image with weights corresponding to feature signal intensity is created from the original image and the weight image is used for structure fitting. This method improves the robustness of the fitting, however, in the presence of strong noise or outlier, this method is not reliable. Under the prior art method, the noise and outliers degrade measurement accuracy and repeatability more than is necessary.

2. Prior Art

In the prior art approach, high quality of the feature weight image produces a good feature fitting result. Yet prior art suffers the limitations imposed by imperfect images. This invention improves on the prior art by dealing with a broad range of input image imperfections that include noise and outliers.

OBJECTS AND ADVANTAGES

It is an object of this invention to improve the robustness of image measurement. Non-contact video or image inspection accuracy and repeatability presently suffers from imperfect images.

It is an object of this invention to use learning images to improve measurement robustness. Learning improves fitting to geometric entities by utilizing learned knowledge of expected feature information and variations.

It is an object of this invention to iteratively improve image measurement. Iteration can progressively reduce the effect of image impairment and thereby increase accuracy and repeatability of measurement.

SUMMARY OF THE INVENTION

In an industrial application, the measurement of geometrical shape and geometrical entity is important for non-contact video or image inspection. When the image is noise free, the feature mask image has good quality and therefore the result of structure fitting is accurate. However, if the image is contaminated by noise and/or is distorted or aberrated, the quality of the feature mask image used for structure fitting may be poor. The feature mask image could include outlier points well beyond the desired geometric entities. A low quality feature mask image degrades the structure fitting result. An alternative arrangement for measurement creates a weight image for fitting. The objective is to create a weight image such that the pixel value of the weight image indicates the degree of certainty or feature signal strength to guide the structure fitting. The fitting method using the weight image is therefore less sensitive to image noise and distortion.

Two embodiments of the invention are described. The first embodiment updates a weight image using the information generated from learning. The second embodiment uses iterative adjustment. For the iterative method, the weight image is adjusted where the fitting error is big.

BRIEF DESCRIPTION OF THE DRAWINGS

The preferred embodiments and other aspects of the invention will become apparent from the following detailed description of the invention when read in conjunction with the accompanying drawings which are provided for the purpose of describing embodiments of the invention and not for limiting same, in which.

DETAILED DESCRIPTION OF THE INVENTION

I. Objective

Figure 1:
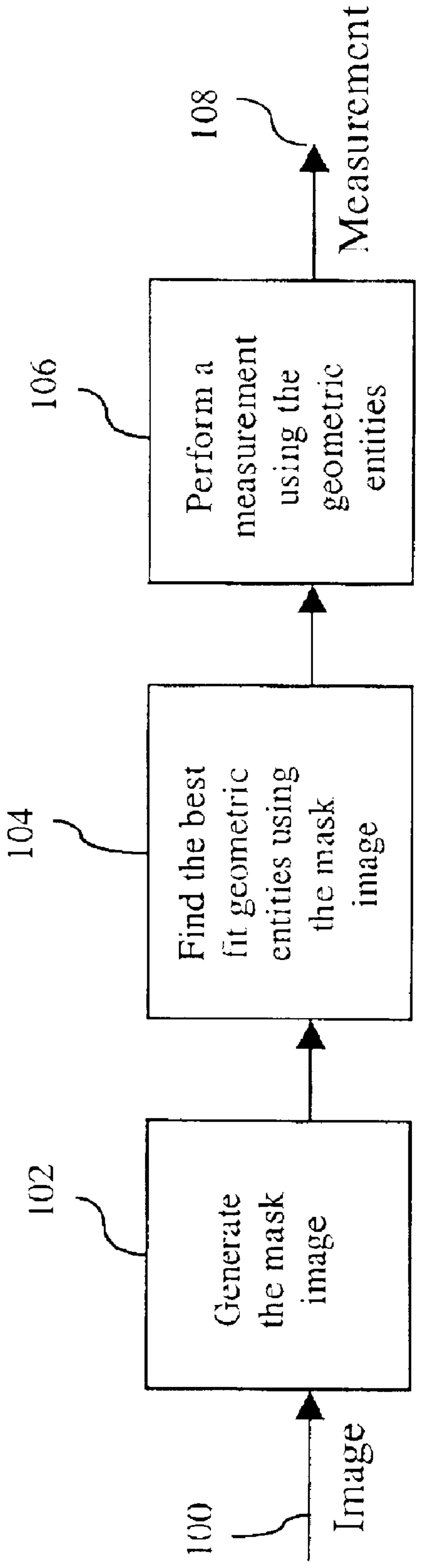
FIG. 1 shows the basic procedure for measurement.

In industrial applications, measurements of geometrical shape and geometrical entity are important for non-contact video or image inspection. These measurements are done using images acquired from an imaging system such as a camera with appropriate illumination and optics. As shown in FIG. 1, the measurement procedure includes three steps. An input image is received 100. Image processing for enhancement may already have been performed on the received image. From this input image 100, a feature mask image is generated 102. The feature mask image contains potential geometric entities of interest. Using the mask image, structure fitting methods are performed 104. Measurement 106 is performed using the structure fitted result. Such structure-guided image processing and measurement methods are disclosed in a co-pending U.S. patent application Ser. No. 09/739,084 entitled, "Structure Guided Image Measurement Method", by Shih-Jong J. Lee et. al., filed Dec. 14, 2000 which is incorporated herein in its entirety.

One method for generating mask images is described in a co-pending U.S. patent application Ser. No. 09/738,846 entitled, "Structure-guided Image Processing and Image Feature Enhancement" by Shih-Jong J. Lee, filed Dec. 15, 2000 which is incorporated herein in its entirety. Mask images are generated using an image thresholding step applied to the feature enhanced image to generate binary level masks of the geometric entities regions of interest. In one embodiment of the invention, boundary masks are generated using a general edge detection method derived from the difference of binary dilation and erosion. A connected component labeling step (ref: U.S. patent application Ser. No. 09/702,629, "Run-Length Based Image Processing Programmed in a Computer", by Shih-Jong J. Lee, filed Oct. 31, 2000) is applied to the boundary masks to assign a unique label for each connected component of the mask image.

Figure 2:
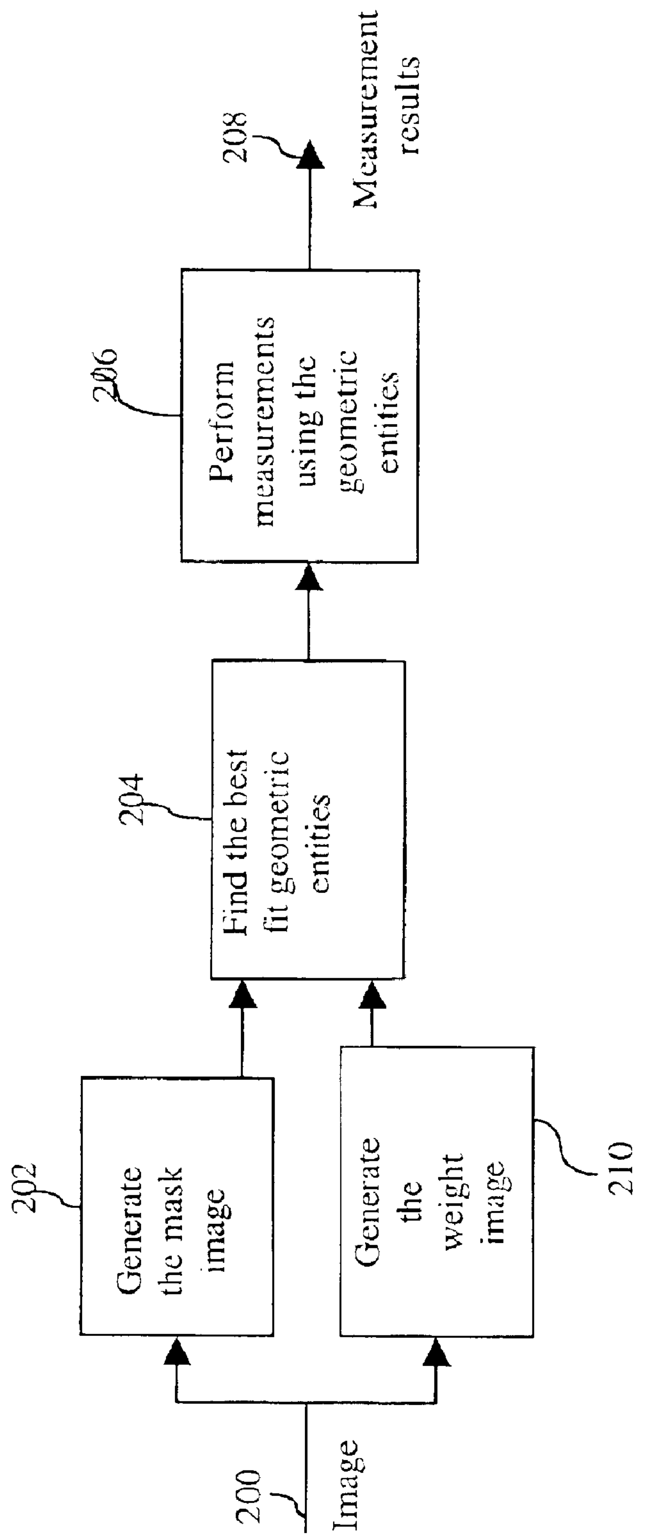
FIG. 2 shows the measurement procedure using a weight image.

When the image is noise free, the mask image should have good quality and therefore the result of the fitting should be accurate. However, if an image is contaminated by noise or is distorted or aberrated, the quality of the mask image may be poor. A low quality feature mask image degrades the structure fitting result. An alternative embodiment for measurement uses a feature mask image and a weight image for structure fitting as shown in FIG. 2. An image is received 200 and a weight image is created 210 along with a feature mask for the image 202 to indicate the area of interest within the image. Using the mask image and the weight image, a structure is fitted 204 and measurements are determined 206 from the fitted geometric entities to produce measurement results 208. The objective is to create a weight image 210 whose pixel value indicates the degree of certainty or feature signal strength for the fitted structure. Methods for creating such a weight image are described in co-pending U.S. patent application Ser. No. 09/738,846 entitled, "Structure-guided Image Processing and Image Feature Enhancement" by Shih-Jong J. Lee, filed Dec. 15, 2000. Because the weight image indicates the degree of certainty or feature signal strength, a fitting method using the weight image is less sensitive to image noise and distortion. However, in the presence of stronger noise, the quality of the feature mask image and the weight image could be degraded significantly. The feature mask image could include outlier points well beyond the desired geometric entities. An example of a line corrupted by outliers and noise is provided in Detailed Description of the Invention—Section V Example. In the example, the outliers and noise cause a poor quality feature mask image and weight image so the initial fitting result is incorrect. This invention provides methods to overcome these difficulties by updating the weight image. Two embodiments of the invention are described. The first embodiment performs adjustment using the information from learning results, and the second embodiment uses iterative adjustment.

II. Geometrical Entity Fitting Using the Weight Image

Figure 3:
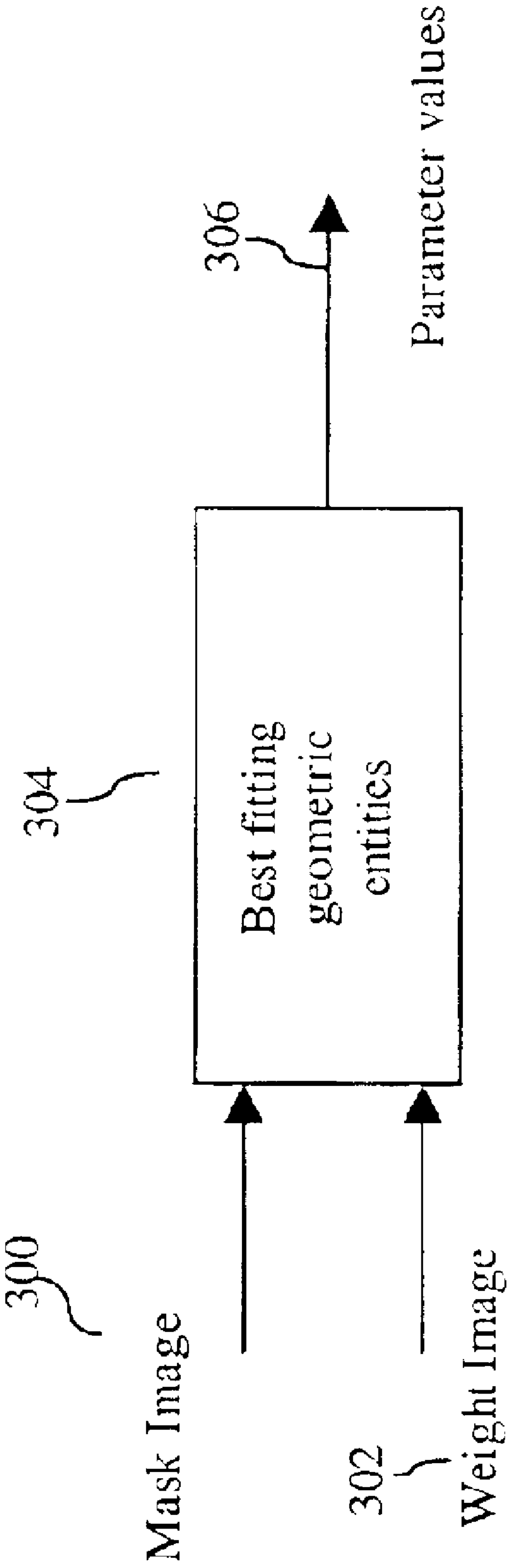
FIG. 3 shows a structure guided measurement procedure.

FIG. 3 shows the procedure for structure fitting using a feature mask image and a weight image. The feature mask image 300 and the weight image 302 are used in combination 304 to create best fitting structure parameter values 306. Let the weight image be $I_W$. From this image, the best fit to the structure $f(x,y;\vec{Q})=0$ can be performed by selecting $\vec{Q}^*$ that minimizes the cost function $$\text{cost} = \sum_m \sum_{i \in C_m} I_w[x_i][y_i] * \left[f(x_i, y_i; \vec{Q})\right]^2$$

Where: $\vec{Q}$ is the parameter vector and $I_W[x_i][y_i]$ is the pixel values of the weight image at pixel $(x_i, y_i)$. There are m geometric entities and $C_m$ is the feature mask region of the $m^{th}$ geometric entity. The best fit is to find the vector $\vec{Q}^*$ that yields the minimum value of cost. The result of this method is highly dependent on the weight image. Good result can be achieved if the corruption of the image is small. However, when image distortion or noise is significant, the resulting fit can be degraded. When the feature mask image contains outliers of the geometrical entity, the result can be much worse since the cost function includes a square of $f(x_i, y_i; \vec{Q})$.

This invention provides a robust method that reduces the effects of noise, distortion, and outliers by adjusting the weight image. A first method is to adjust the weight image uses learning information, and a second method adjusts the weight image iteratively.

III. Weight Image Adjustment Using Learning Images

Figure 4:
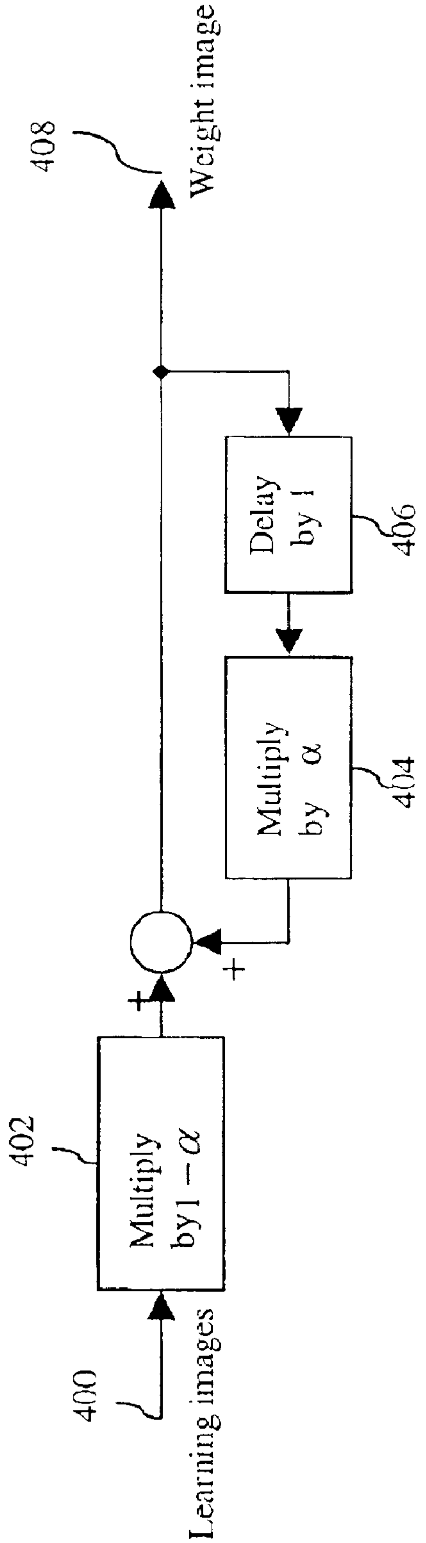
FIG. 4 shows a method for accumulating a weight image.

Learning images are acquired from the expected applications. The learning method accumulates the information contained within the feature mask regions of the learning images. One embodiment of the invention accumulates the learning images as shown in FIG. 4. A learning image 400 is received and weighted by (1−α) 402. The weighted learning image is added to the previous weight image result 406 that has been further weighted by a factor α 404 to produce a new weight image 408. The mask image could be dilated prior to performing the accumulation to avoid misalignment. In one embodiment of the invention, a weighted mean image and a weighted mean of square image are accumulated. The weighted mean image and the weighted mean of square image can be updated by the following rule.

$$I_{W,inter}(n+1)=\alpha I_{W,inter}(n)+(1-\alpha)I_u(n+1)$$

$$K_{W,inter}(n+1)=\alpha K_{W,inter}(n)+(1-\alpha)I_u^2(n+1)$$

where the value α ($0\leqq\alpha<1$) determines the contribution ratio of the accumulated and the new image, $I_u(n+1)$ is the $n+1^{th}$ learning image, $I_{W,inter}(n)$ is the weighted mean image result for accumulation up to the $n^{th}$ learning image. $I_{W,inter}(n+1)$ is the weighted mean image result for accumulation up to the $n+1^{th}$ learning image. $K_{W,inter}(n)$ is the weighted mean of the square image result for accumulation up to the $n^{th}$ learning image. $K_{W,inter}(n+1)$ is the weighted mean of square image result for accumulation up to the $n+1^{th}$ learning image.

To achieve exponential weighted moving average, α can be set to a constant. This emphasizes newer learning images. In this case, the order of learning is important. It is used when the noise process is changing with respect to image sequence and more recent images provide better knowledge about the next image.

Alternatively, a simple equal weight average can be achieved by setting:

$$\alpha=\frac{n}{n+1}$$

In this case, α increases with each learning iteration. This is used when there is no value to order in the learning process.

A deviation image $I_D(n)$ of the weight image for up to the $n^{th}$ learning image can be derived by the following rule:

$$I_{D,inter}(n)=\sqrt{K_{W,inter}(n)-I_{W,inter}^2(n)}$$

The deviation image is a measure of the local (i.e. pixel) variability of the image across the n learning images.

In one embodiment of the invention, the mask image is generated when the fitting method is applied to a first learning image and the initial condition is set as follows:

$$I_{W,inter}(1)=I_u(1)$$

$$K_{W,inter}(1)=I_u^2(1)$$

Figure 5:
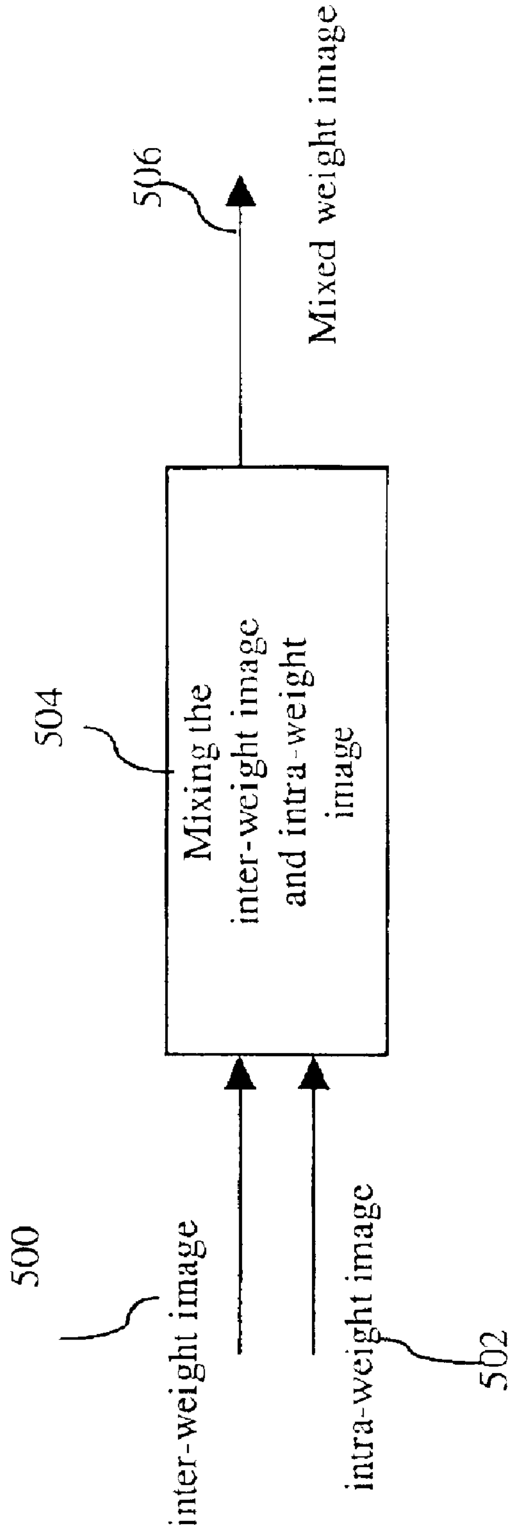
FIG. 5 shows creation of a mixed weight image.

In the application phase, a weight image derived only from the input image (intra-weight image) can be mixed with the weight image derived from the learning result (inter-weight image) as shown in FIG. 5. In FIG. 5 an inter-weight image 500 is mixed with an intra-weight image 502 using a mixing method 504 to produce a mixed weight image result 506. Several mixing methods 504 can be used. One mixing method 504 is the minimum operation:

$$I_W[x][y]=\min(I_{W,inter}[x][y], I_{W,intra}[x][y]).$$

A high value of $I_W$ means high certainty, so this method picks the local alternative (i.e. pixel level) that weights information with the maximum represented uncertainty (minimum represented certainty).

Those skilled in the art should recognize that other mixing operations 504 could be used including a maximum operation or a simple average operation or other operations.

Figure 6:
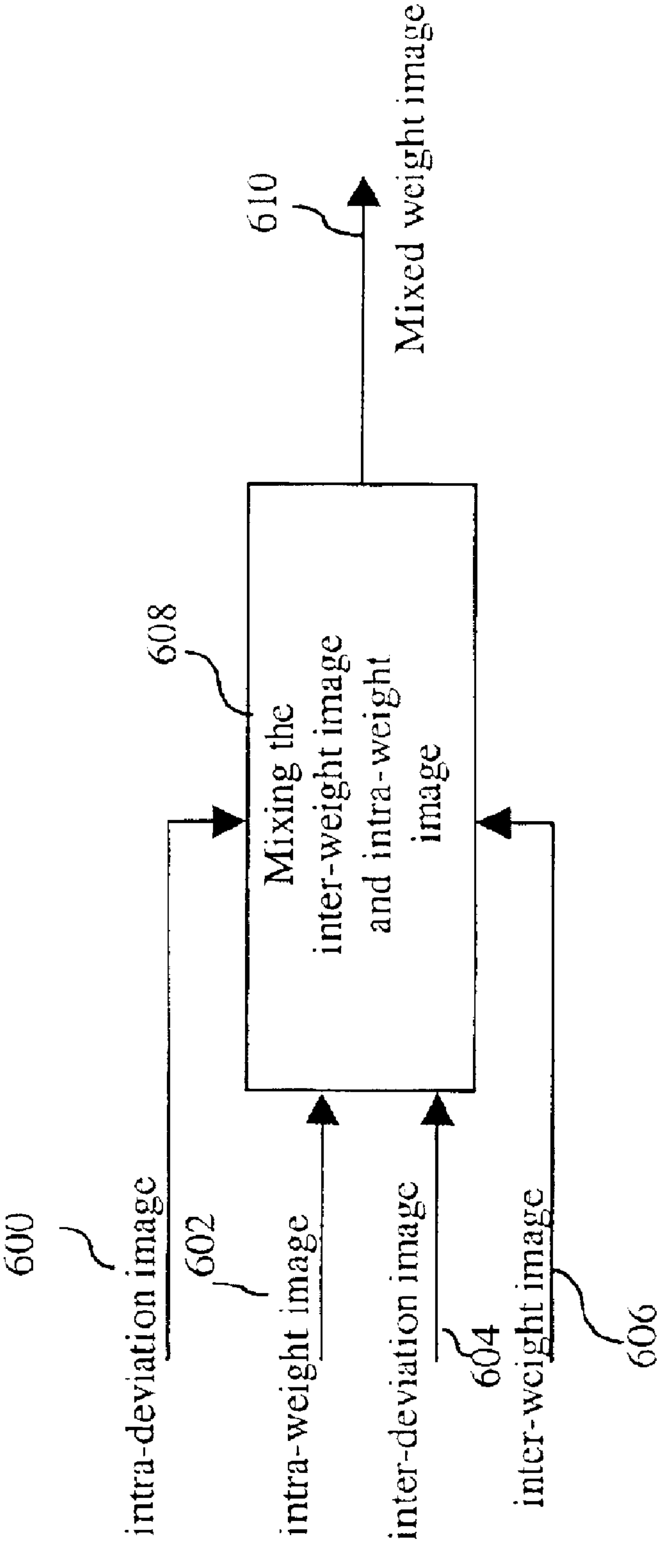
FIG. 6 shows creation of a mixed weight image from the deviation images and weight images.

If an intra-deviation image is available, the mixing method can use the information from the deviation image as shown in FIG. 6. In FIG. 6, an inter-weight image 606 is mixed with an intra-weight image 602, an inter-deviation image 604 and an intra-deviation image 600 using a mixing method 608 to produce a mixed weight image 610.

In one embodiment of the invention, the mixing method 608 can be implemented by the following rule:

$$I_W[x][y]=\begin{cases} I_{W,inter}[x][y] & \text{if } I_{D,inter}[x][y]\leq I_{D,intra}[x][y] \\ I_{W,intra}[x][y] & \text{otherwise}\end{cases}$$

This method picks the local alternative (i.e. pixel alternative) for greatest certainty of the weight image.

An alternative embodiment of the invention, the method 608 can be implemented by the following rule:

$$I_W[x][y]=\frac{I_{W,inter}[x][y]*I_{D,intra}[x][y]+I_{W,intra}[x][y]*I_{D,inter}[x][y]}{I_{D,intra}[x][y]+I_{D,inter}[x][y]}$$

Figure 7:
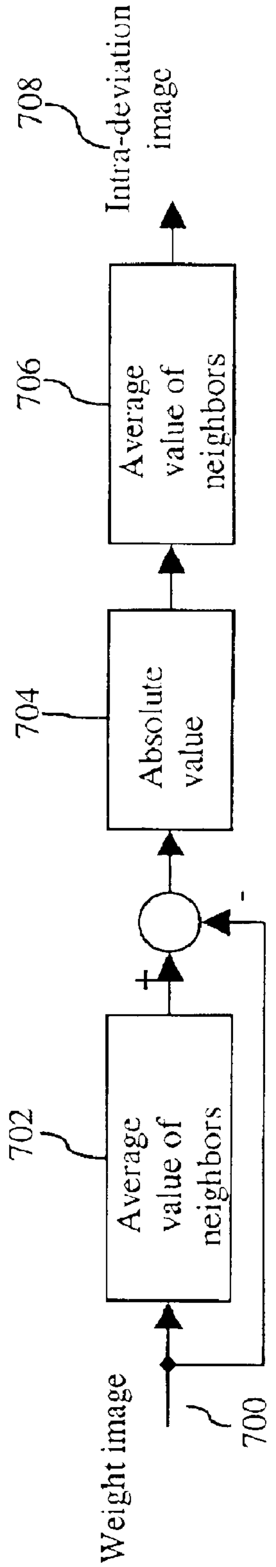
FIG. 7 shows a method to derive the intra-deviation image from the weight image.

This method gives softer mixing rather than discontinuous hard mixing selection in the previous method. Therefore, it could yield more robust estimates of the weight image. A smaller pixel value of the deviation image indicates a higher certainty of the corresponding pixel in the weight image. To apply this mixing method, the intra-deviation image 600 of the weight image $I_{D,intra}[x][y]$ needs to be generated. The generation of the intra-deviation image of the weight image uses neighboring information as shown in FIG. 7. The weight image pixel 700 is combined with the average value of neighboring pixels 702 by subtraction. The absolute difference values are used 704 and the average value of neighboring pixels replaces the individual pixel 706 to produce an intra-deviation image result 708. This method reduces high spatial frequency noise. In a preferred embodiment, 8 nearest neighbors are used for averaging. Those skilled in the art should recognize that the number of neighbors used depends upon the noise power spectrum.

Other methods could be used to match the nature and the distribution of the noise power spectrum.

IV. Iterative Adjustment of Weight Image

Figure 8:
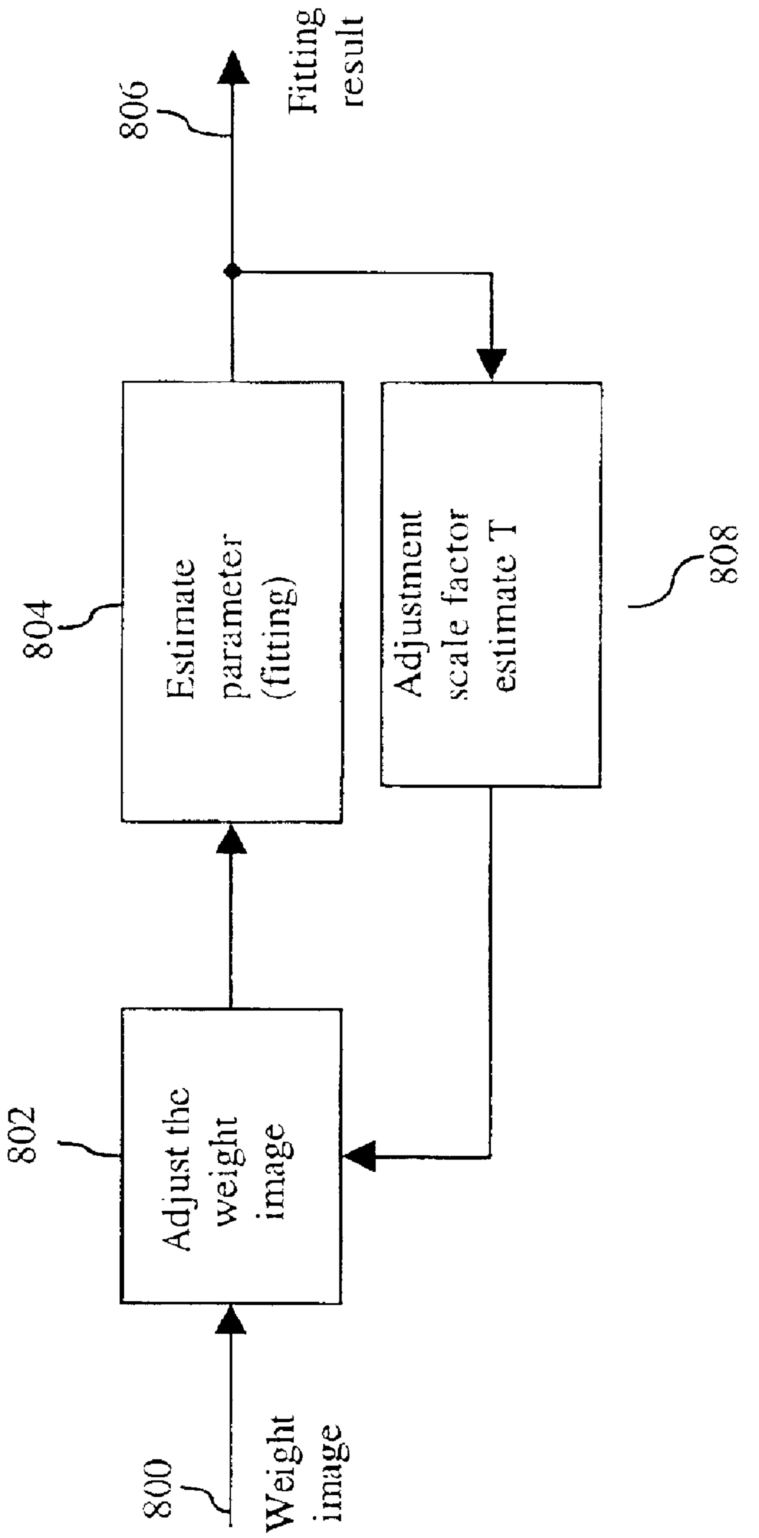
FIG. 8 shows the procedure for iterative modification of the weight image for fitting.

This iterative fitting method adjusts the weight image as shown in FIG. 8. A weight image 800 is received and adjusted 802 pixel by pixel based upon a scale factor 808 for each pixel determined from the prior fitting result. Using the adjusted weight image, a new fitting result 806 is generated by parameter estimation 804. In the first fitting iteration, the adjustment operation is not performed. It is performed in all subsequent fitting iterations.

This method provides better fitting results by using the previous fitting result to adjust the weight image. If the previous fitting error measured by the cost function defined in Detailed Description of the Invention—Section II (the fitting error is measured individually, pixel by pixel) is large, the pixel value of the adjusted weight image will be smaller. This effectively minimizes the effect of the pixels having the large fitting errors. In a preferred embodiment, the weight image is adjusted by a multiplication factor that is a non-increasing function of the fitting error. Mathematically, $$I_{W,n+1}[x][y]=I_W[x][y]*r(|f(x,y;\vec{Q}_n)|;T)$$

where $I_{W,n}[x][y]$ is the adjusted weight image at the $n^{th}$ iteration. $\vec{Q}_n$ is the parameter vector which is the result of the $n^{th}$ iteration. r(z;T) is a non-increasing function. Examples of r(z;T) include $$r(z;T)=\exp\left(-\frac{z}{T}\right),$$

$$r(z;T)=\exp\left(-\frac{z^2}{T^2}\right), \text{ or}$$

$$r(z;T)=\frac{1}{1+\left(\frac{z}{T}\right)^2}$$

The above non-increasing function has a parameter T whose value determines the speed of convergence during the iteration. T can be a constant for all iterations or it can vary during the iterations. If T is large, then the iteration could converge to the global minimum of the cost function, but the convergence speed is slow. Conversely, if T is small, the convergence speed is fast, but the end result is not guaranteed to converge to the global minimum. To achieve a good balance, the T value can vary with the number of iterations. In one embodiment of the invention, the simulated annealing method (Stuart Geman et. al., "Stochastic Relaxation, Gibbs Distributions, and the Bayesian Restoration of Images", IEEE Transactions on Pattern Analysis and Machine Intelligence, Vol. PAMI-6, No. 6, November 1984, pp. 721–741) can be used. To achieve good performance, T should be non-increasing with the number of iterations. One good choice is $$T(n)\propto 1/\log(n+1)$$

where n is the number of iterations.

Those skilled in the art should recognize that there are many other functional relations between T and n. For example:

$$T(n)\propto 1/n$$

and $$T(n)\propto 1/(1+kn^2).$$

V. Stopping Criteria

In one embodiment of the invention, if the maximum allowable error of the parameter $\vec{Q}$ at each iteration is defined as $\epsilon$, then the stopping criteria is $$|\vec{Q}_{n+1}-\vec{Q}_n|<\varepsilon$$

The operation |a−b| can be $L_1$ (norm 1), $L_2$ (norm 2), and $L_\infty$ (norm ∞) between a and b. An alternative embodiment of the invention uses a maximum allowable iteration N as the stopping criteria. That is If the number of iterations=N, then stop.

Another alternative embodiment of the invention uses both the maximum allowable error and the maximum allowable iteration for the stopping criteria. The weight adjustment iteration will be stopped if either one of the criteria is met.

VI. Example

Figure 9A:
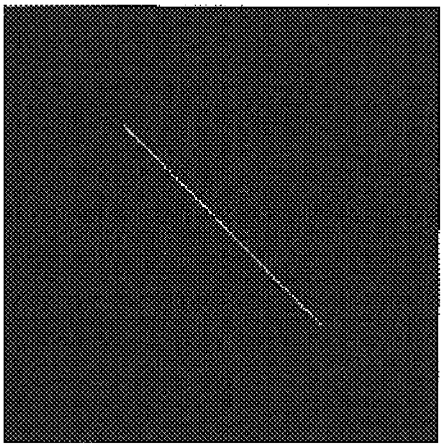
FIG. 9A shows an example perfect line image.
Figure 9B:
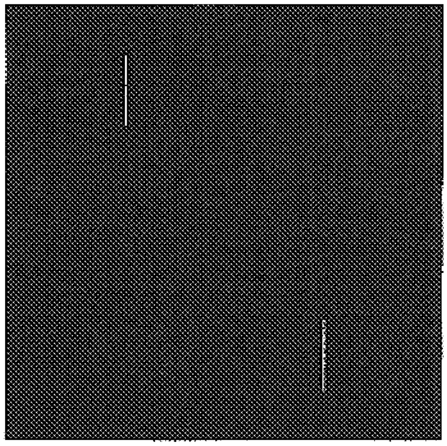
FIG. 9B shows outliers to add to the example image.
Figure 9C:
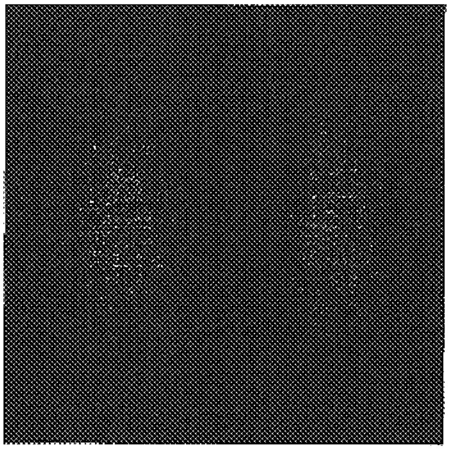
FIG. 9C shows background noise to add to the example image.
Figure 9D:
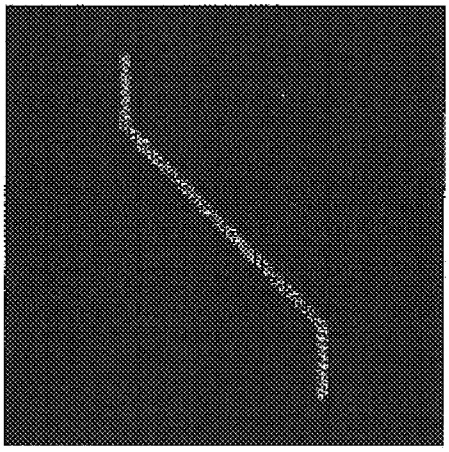
FIG. 9D shows the example line image with outliers and image blurring.
Figure 9E:
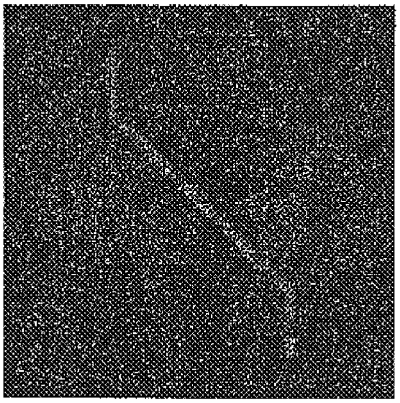
FIG. 9E shows the degraded image created by adding random noise and background noise to the image in FIG. 9D.
Figure 9F:
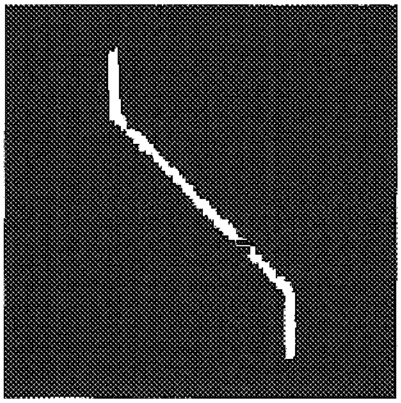
FIG. 9F shows the mask image that is extracted from the image.
Figure 9G:
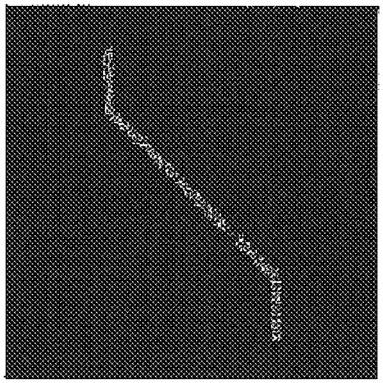
FIG. 9G shows the extracted weight image used for fitting.
Figure 10:
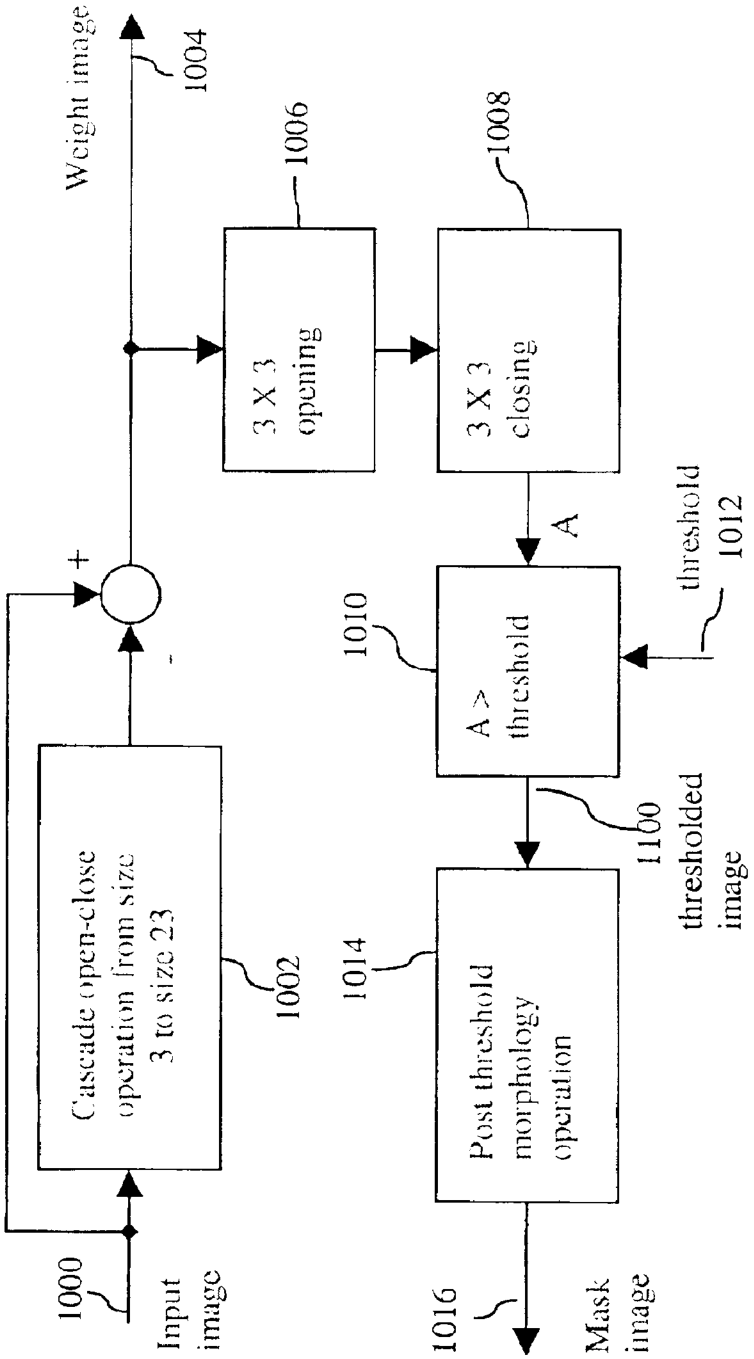
FIG. 10 shows the processing flow for creating a feature mask image.
Figure 11:
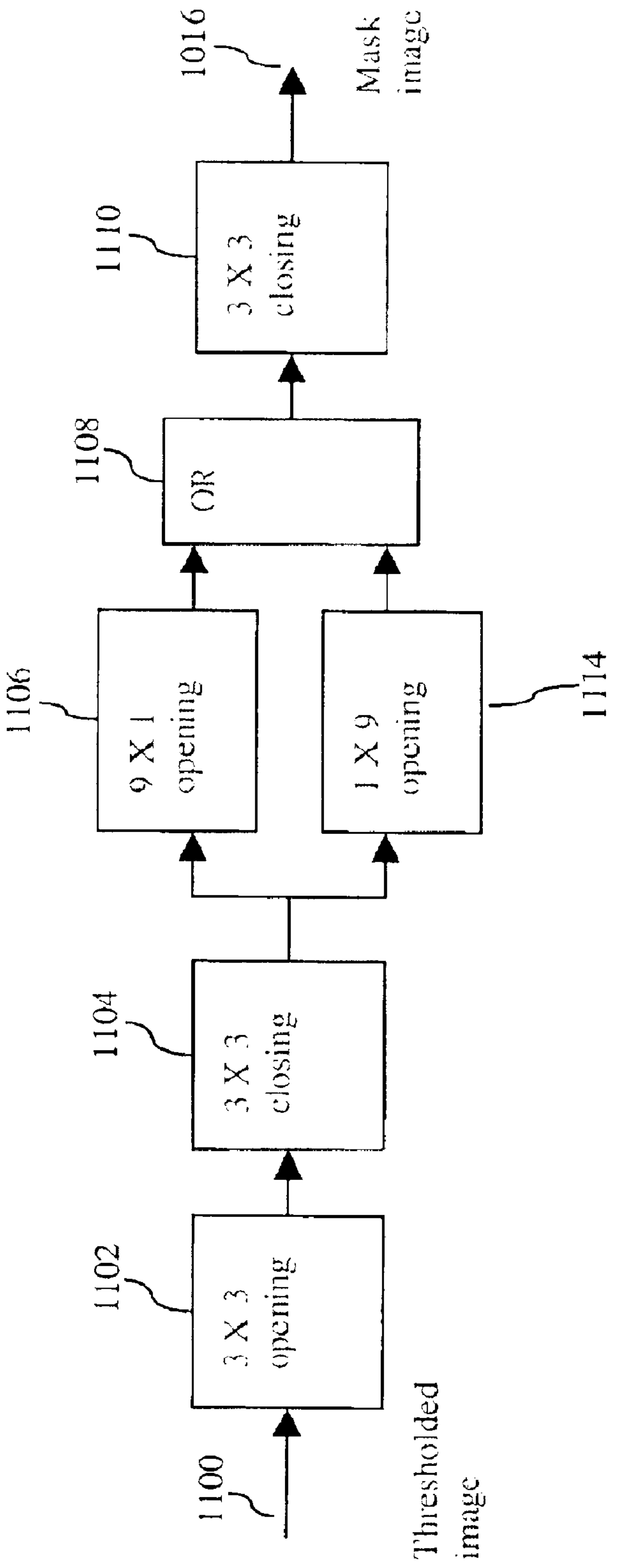
FIG. 11 shows the processing flow of the post threshold morphology operation used in FIG. 10.

FIGS. 9A–K show an example for iteratively adjusting the weight image. To construct the degraded image (FIG. 9E), an example line image (FIG. 9A) is degraded by outliers (FIG. 9B) and background noise (FIG. 9C) and then blurred (FIG. 9D) with random noise added to become FIG. 9E. Blurring and noise are physical effects common to imaging systems. The resulting example image is composed of the line segment with two outliers and significant image spatial noise. The feature mask image (FIG. 9F) is extracted from the degraded image (FIG. 9E) using the process shown in FIG. 10 and FIG. 11. Creation of feature mask images is described in co-pending U.S. patent application Ser. No. 09/738,846 entitled, "Structure-guided Image Processing and Image Feature Enhancement" by Shih-Jong J. Lee, filed Dec. 15, 2000 which is incorporated in its entirety herein. FIGS. 10 and 11 further describe the process used in this particular example, to create the mask image. An edge enhancement process consists of subtraction of the result of a cascade of fitting operations 1002 from the input image 1000 that creates a weight image 1004. In this embodiment, the cascade open-close operation is applied by increasing the structure elements from size 3 to size 23 with an increment of 2 in each iteration. That is: open(3,3)→close(3,3)→open (5,5)→close(5,5)→ . . . →open(23,23)→close(23,23). An opening 1006 and closing 1008 operation removes residual image noise from the weight image 1004 before thresholding 1010 is applied. After thresholding, the process shown in FIG. 11, 1014, is used to remove artifacts that corrupt the thresholded result. FIG. 11 further describes the post threshold morphology operation 1014. In this particular example embodiment, the thresholded image 1100 is opened 1102, closed 1104, and the result is filtered twice using elongated filters 1106, 1114 and then combined by union (OR operation) 1108 and further closed 1110 to produce the mask image 1016. The resulting mask image 1016 is still somewhat corrupted by noise and outliers. Using the mask image, the weight image is extracted from the original image. The extracted image used for fitting is shown in FIG. 9G. In this example embodiment, fitting is done using the single line fitting method described in co-pending U.S. patent application Ser. No. 09/739,084 entitled, "Structure Guided Image Measurement Method", by Shih-Jong J. Lee et. al., filed Dec. 14, 2000 which is incorporated in its entirety herein. There is one geometric entity in the feature mask image and the function to minimize is ax+by+c=0 where a, b and c are the parameters of the line with $a^2+b^2=1$. The r(z;T) selected for this example is a monotonically decreasing function as follows:

$$r(z;T)=\exp(-z/T)$$

where $$z=|ax+by+c|$$

and T=2

Figure 9H:
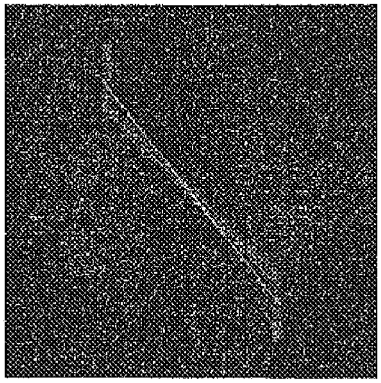
FIG. 9H shows the first iteration fitting result by overlaying the fitted line with the distorted image.
Figure 9I:
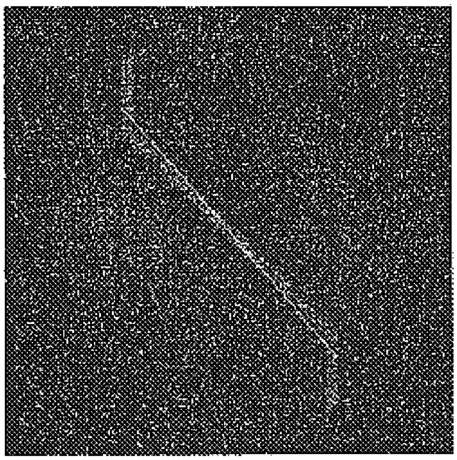
FIG. 9I shows the fitting result after 3 iterations.
Figure 9J:
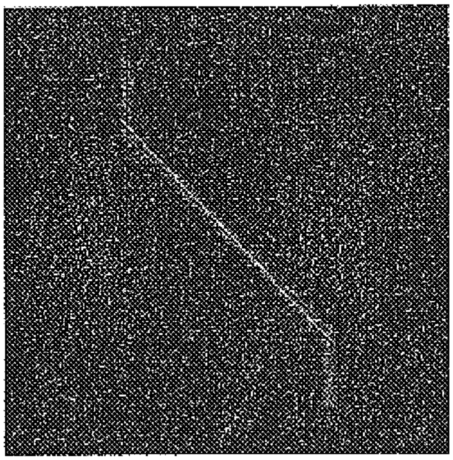
FIG. 9J shows the fitting result after 6 iterations.
Figure 9K:
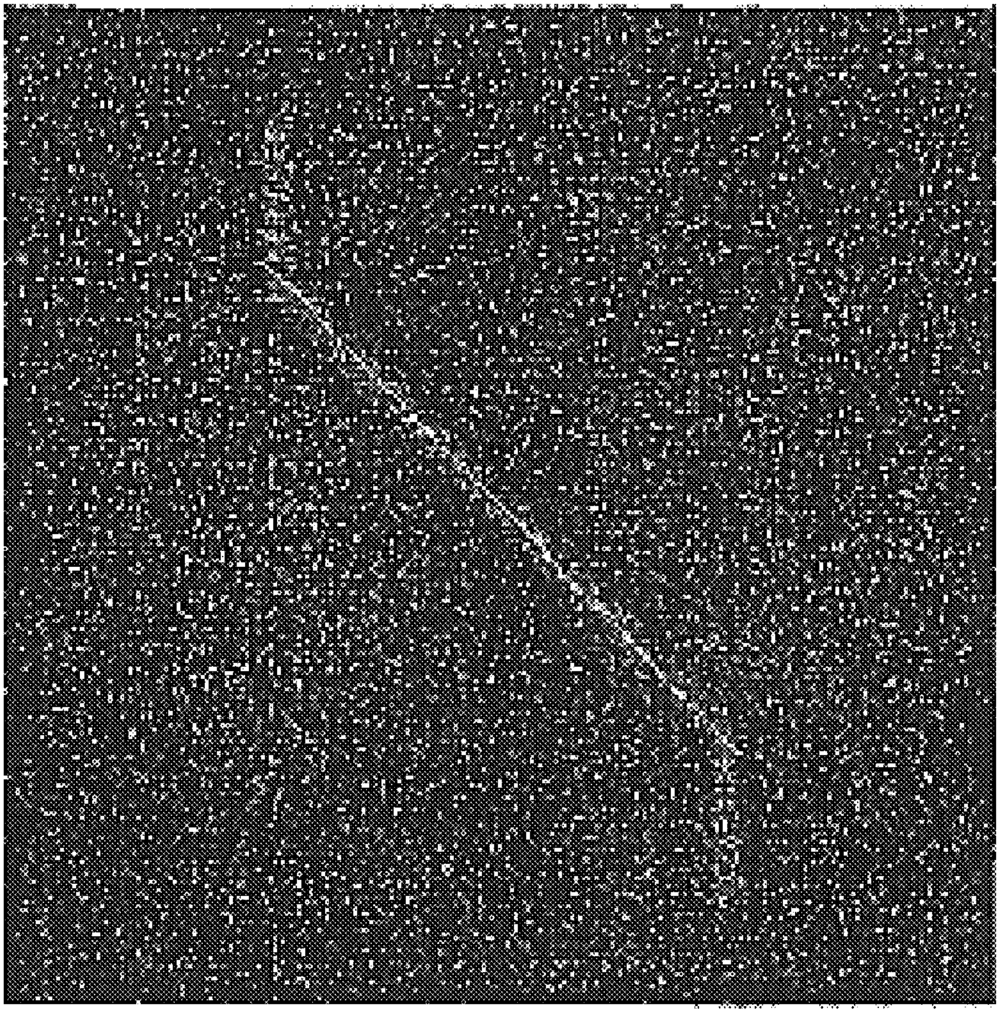
FIG. 9K shows the fitting result after 10 iterations.

FIG. 9H shows the first fitting result. The outliers and the image noise corrupt this result. FIG. 9I shows the fitting result after three iterations. FIG. 9J shows the fitting result after six iterations. FIG. 9K shows the fitting result after ten iterations. After ten iterations the result has a minimal effect caused by the outliers and image noise. The robustness of the iterative method with an image contaminated by noise, blurring, and outliers is demonstrated.

The invention has been described herein in considerable detail in order to comply with the Patent Statutes and to provide those skilled in the art with the information needed to apply the novel principles and to construct and use such specialized components as are required. However, it is to be understood that the inventions can be carried out by specifically different equipment and devices, and that various modifications, both as to the equipment details and operating procedures, can be accomplished without departing from the scope of the invention itself.

What is claimed is:

1. A robust method for image feature estimation comprising:

a. receiving at least one learning image input;

b. accumulating a weight image from the at least one learning image;

c. processing the at least one learning image using the accumulated weight image to produce a weight image output wherein the weight image is derived from an intra-weight image mixed with an inter-weight image.

2. The method of claim 1 wherein the intra-weight image mixed with the inter-weight image uses a minimum operation.

3. The method of claim 1 wherein the intra-weight image mixed with the inter-weight image uses a simple average operation.

4. The method of claim 1 wherein the intra-weight image mixed with the inter-weight image uses a maximum operation.

5. A robust method for image feature estimation comprising:

a. receiving at least one learning image input;

b. accumulating a weight image from the at least one learning image;

c. processing the at least one learning image using the accumulated weight image to produce a weight image output wherein the weight image is derived from mixing i. an intra-deviation image;

ii. an intra-weight image;

iii. an inter-deviation image;

iv. an inter-weight image.

6. A robust method for image feature estimation comprising:

a. receiving at least one image input;

b. adjusting a weight image by iteration responsive to a cost function comprising i. performing fitting using an adjusted weight image to generate a fitting ii. determine cost function values from the fitting result;

iii. adjusting the weight image using cost function values;

iv. repeat steps i, ii, and iii until a stopping criteria is met wherein the stopping criteria is determined by the maximum allowable error, c. estimating using the adjusted weight image to produce a fitting result.

* * * * *